UNITED STATES PATENT OFFICE.

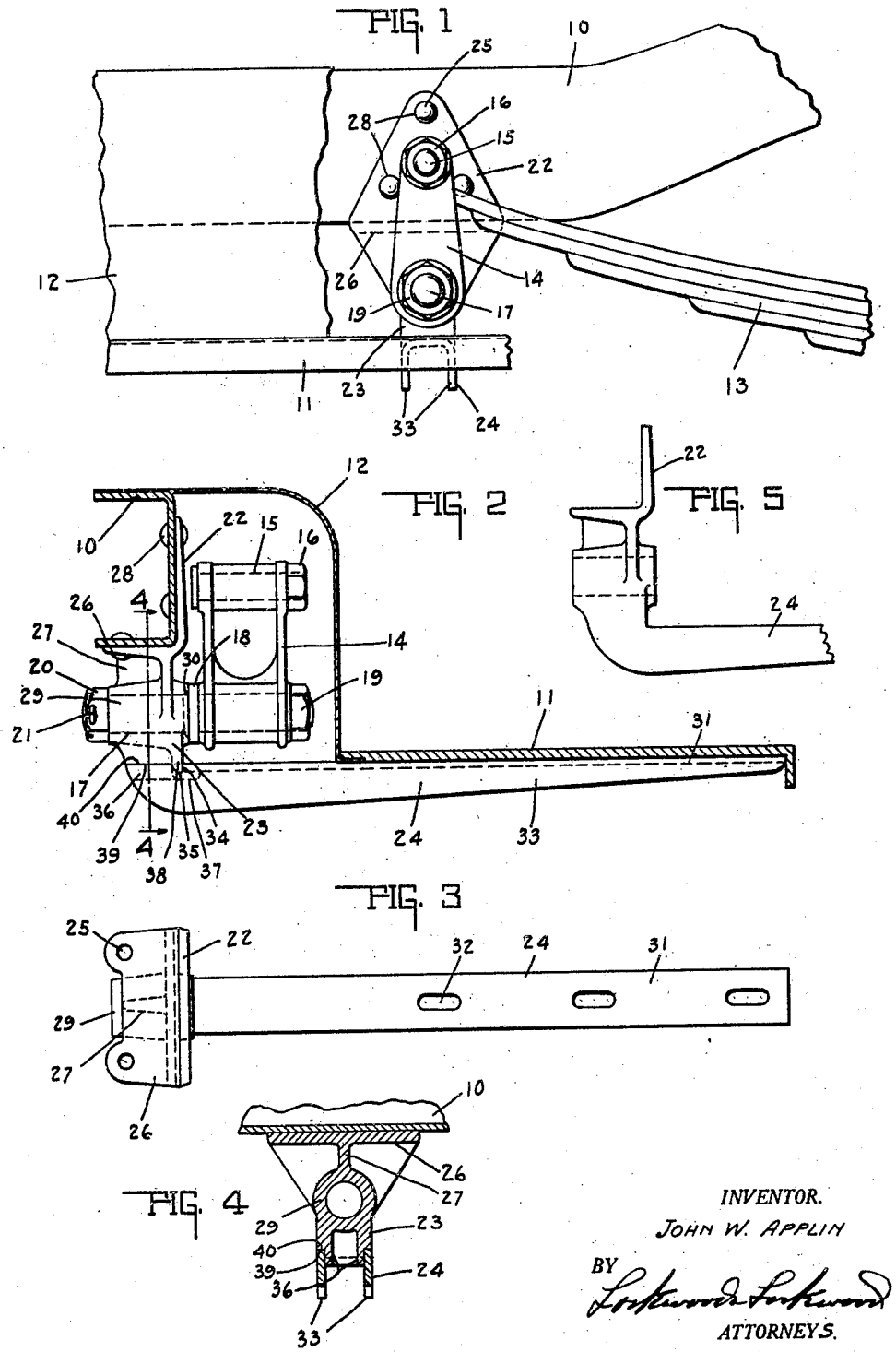

JOHN W. APPLIN, OF INDIANAPOLIS, INDIANA, ASSIGNOR TO LA FAYETTE MOTORS COMPANY, OF INDIANAPOLIS, INDIANA, A CORPORATION OF DELAWARE.

RUNNING-BOARD SUPPORT.

1,359,480.   Specification of Letters Patent.   Patented Nov. 23, 1920.

Application filed January 2, 1920. Serial No. 349,100.

*To all whom it may concern:*

Be it known that I, JOHN W. APPLIN, a citizen of the United States, and a resident of Indianapolis, county of Marion, and State of Indiana, have invented a certain new and useful Running-Board Support; and I do hereby declare that the following is a full, clear, and exact description thereof, reference being had to the accompanying drawings, in which like numerals refer to like parts.

The chief object of this invention is to provide a novel and unique supporting bracket for a running board, and provide the same with a shackle stud or pin bearing, the same being adapted to mount the shackle of a spring member.

One feature of the invention is in drop-forging the mounting for the combined bracket and the shackle pin bearing and in stamping the running board supporting bracket and welding the drop-forging and the stamping together in any suitable manner.

A further feature of the invention is in providing interlocking portions upon the running board supporting portion and the shackle pin bearing portion.

The full nature of the invention will be understood from the accompanying drawings and the following description and claims.

In the drawings, which are made a part of this application, Figure 1 is a side elevational view of a portion of a chassis of a vehicle to which the invention has been applied. Fig. 2 is a side view of the invention, the same being shown secured to the vehicle frame and supporting the spring and running board of the vehicle. Fig. 3 is a top plan view of the novel and improved bracket. Fig. 4 is a sectional view taken on the line 4—4 of Fig. 2 and shows the interlocking connection between the running board bracket and the shackle pin bearing bracket. Fig. 5 is a partial view of the shackle pin bearing bracket and the running board bracket after the same have been combined.

In the drawings 10 indicates the frame of a vehicle to which the improved bracket is secured, 11 the running board thereof and 12 the protecting dust guard members, the same being found in many motor vehicles and the like. The vehicle is here shown provided with a semi-elliptical spring 13, the same being secured at one end to a shackle 14 by suitable means, such as a bolt 15 and nut 16. The shackle is herein shown secured to the improved bracket by other suitable means, such as a novel pin 17, the same having an annular shoulder 18 intermediate the ends thereof, said shoulder being interposed between said improved bearing bracket and the shackle. The pin or stud 17 is secured to the shackle by a nut 19; while the pin is secured to the improved bracket by a nut 20 and cotterpin 21.

The improved bracket is herein shown comprising three portions, the mounting portion 22, the shackle mounting portion 23 and the running board portion 24. The supporting portion 22 is herein shown formed diamond shaped, and is provided with three holes 25 in the upper triangle of said diamond shape. Approximately midway between the ends of said diamond shaped support is an angularly extending and horizontal bracket portion 26, the same being provided with a pair of similar holes 25. With this construction the combined bracket may be rigidly secured by rivets 28 to the frame 10, so that the bracket will have no movement upon the frame and all movement of the bracket will be transmitted to the frame.

The lower half of said diamond shaped supporting portion is provided with a transversely and substantially horizontally extending shackle pin bearing 29. A vertically and transversely extending web 27 connects the transverse supporting member 26 and the pin bearing 29. The bearing is herein shown provided with a chamfered or beveled face 30 to prevent binding of the annular shoulder therewith. The portions 22 and 23 are preferably formed up by drop forging the same.

The running board bracket 24 is herein shown formed of a substantially flat running board supporting portion 31, the same being slotted at 32 and adapted to receive suitable securing means for the running board. Depending from the supporting portion 31 are the reinforcing cantaliver sides 33 extending substantially the entire length of the member 31 and formed therefrom, as by bending.

The means for interlocking the running board bracket and the supporting portion is shown in detail in Figs. 2 and 4. The member 31 is cut away at 34 to form a slot and each of the cantaliver sides are notched as at 35 adjacent the inner end of the slot 34. The bearing has depending side portions 36 which fit between the sides 33. A forwardly extending projection 37 is adapted to underlie the portion 31 of the running board bracket where the same is slotted at 34 and through which the portions 36 and 37 pass. To aid in assembling, the bearing is shown provided with a pair of ears 38, which are seatable in the notches 35 in the cantaliver sides 33. The edge 39 of the cantaliver arm abuts the portion 40 on the bearing and prevents upward movement of the cantaliver arm while the side portions 36 lock the cantaliver bracket against sideward movement.

After the running board bracket and the supporting bracket portion are mechanically interlocked, as described, the same are welded together in any suitable manner forming a single, combined, unique and novel bracket, as shown in Fig. 5.

It will be understood from the foregoing that while the invention has been described in great detail, many modifications thereof are possible and the invention is not to be limited by thus describing the invention in detail.

The invention claimed is:

1. A running board support comprising a mounting portion adapted to be rigidly secured upon a vehicle, a shackle pin bearing formed therein, and a running board bracket supported by said mounting beneath said pin bearing.

2. A running board support comprising a shackle pin bearing, a cantaliver running board bracket, interlocking means associated with said bearing and said cantaliver bracket, and means for securing said parts when interlocked to a vehicle.

3. A running board support comprising a shackle pin bearing, a cantaliver running board bracket suitably slotted at its supported end, depending side portions secured to said bearing and seatable upon said cantaliver and bearing against the adjacent side of said side portions, and a depending forwardly extending portion seatable in said slot and engageable upon the under side of said running board bracket, substantially as shown.

4. A running board support comprising a shackle pin bearing, a cantaliver running board bracket suitably slotted at its supported end, depending side portions secured to said bearing and having a slot in the upper edge thereof adjacent said first mentioned slot, said depending portions secured to said cantaliver and bearing against the adjacent sides of said side portions, a depending forwardly extending portion seatable in said first mentioned slot and engageable upon the under face of said cantaliver bracket, and ears formed upon said depending portions seatable in said second mentioned slots.

In witness whereof, I have hereunto affixed my signature.

JOHN W. APPLIN.